United States Patent [19]
Yoshihara

[11] Patent Number: 4,795,771
[45] Date of Patent: Jan. 3, 1989

[54] POLYESTER COMPOSITION

[75] Inventor: Nori Yoshihara, Ohtsu, Japan

[73] Assignee: Toyo Boseki Kabushiki Kaisha, Osaka, Japan

[21] Appl. No.: 17,944

[22] Filed: Feb. 24, 1987

[30] Foreign Application Priority Data

Feb. 26, 1986 [JP] Japan .................................. 61-40731

[51] Int. Cl.$^4$ ............................................. C08L 67/02
[52] U.S. Cl. .................................... 524/114; 524/292; 524/308; 524/449; 524/451; 525/438; 525/444
[58] Field of Search ............... 524/114, 449, 451, 292, 524/308; 525/438, 444

[56] References Cited

U.S. PATENT DOCUMENTS

| | | | |
|---|---|---|---|
| 3,410,927 | 11/1968 | Crovatt | 525/437 |
| 4,215,032 | 7/1980 | Kobayashi | 524/605 |
| 4,357,268 | 11/1982 | Vanderkooi | 524/285 |
| 4,371,476 | 2/1983 | Newkirk | 524/284 |
| 4,551,485 | 11/1985 | Ragan | 523/212 |
| 4,666,965 | 5/1987 | Aoki | 524/114 |

*Primary Examiner*—Patricia Short

[57] ABSTRACT

A polyester composition wich comprises
(a) 100 parts by weight of a polyester containing at least 80 mol % of ethylene terephthalate repeating unit,
(b) 1 to 15 parts by weight of a carboxylic acid ester of a polyalkylene glycol or its derivative,
(c) 0.01 to 10 parts by weight of an epoxy compound having a polyoxyalkylene chain, and
(d) 0.1 to 50 parts by weight of an inorganic filler.

6 Claims, No Drawings

POLYESTER COMPOSITION

FIELD OF THE INVENTION

The present invention relates to a polyester composition for molding. More particularly, the polyester composition of the present invention provides a molded product in which crystallization progresses to the surface layer thereof even when molding is carried out at a mold temperature of not more than 100° C. Further, a molded product of the polyester composition of the present invention has good dimensional stability and high heat distortion temperature.

BACKGROUND OF THE INVENTION

In the case of molding of a conventional polyester composition at a mold temperature of not more than 100° C., mold release characteristics become inferior because of low crystallization rate. Further, there are problems such as poor dimensional stability and inadequate heat distortion temperature due to insufficient crystallizability.

In order to solve these problems, Japanese Patent Kokoku No. 59-10698 discloses addition of a mono or polyglycidyl ether derivative of a polyalkylene glycol or its monoether to a polyester composition. Japanese Patent Kokai No. 54-158452 discloses addition of a combination of neopentyl glycol dibenzoate and a special nucleating agent to a polyester composition.

However, in these known techniques, molding characteristics are still insufficient and, particularly, in the case of a thin-walled molded product which tends to be cooled quickly, molding characteristics are unsatisfactory. For example, depending upon a particular additive, a composition increases in viscosity and gels or, to the contrary, it decreases in strength due to low miscibility for a polyester, or gas is produced during molding.

OBJECTS OF THE INVENTION

One object of the present invention is to provide a polyester composition crystallization of which progresses sufficiently even at a low mold temperature such as 70° C.

Another object of the present invention is to provide a polyester composition a molded product of which has a high heat distortion temperature such as more than 100° C., preferably, not less than 200° C.

Still another object of the present invention is to provide a polyester composition which can be molded into a thin-walled molded product satisfactorily.

These objects as well as other objects and advantages of the present invention will become apparent to those skilled in the art from the following description.

SUMMARY OF THE INVENTION

According to the present invention, there is provided a polyester composition which comprises
(a) 100 parts by weight of a polyester containing at least 80 mol % of ethylene terephthalate repeating unit,
(b) 1 to 15 parts by weight of a carboxylic acid ester of a polyalkylene glycol or its derivative,
(c) 0.01 to 10 parts by weight of an epoxy compound having a polyoxyalkylene chain, and
(d) 0.1 to 50 parts by weight of an inorganic filler.

In a molded product of the polyester composition of the present invention, crystallization progresses to the surface layer thereof even when molding is carried out at a mold temperature of not more than 100° C. Further, a molded product of the polyester composition of the present invention has good dimensional stability and high heat distortion temperature.

DETAILED EXPLANATION OF THE INVENTION

The polyester (a) used in the present invention is polyethylene terephthalate or a polyester copolymer resin containing at least 80 mol %, preferably, not less than 90 mol % of ethylene terephthalate repeating unit. As the copolymerizable component, a wide variety of acid components and/or glycol components can be used. Examples of the acid components include isophthalic acid, naphthalene-1,4- or 2,5-dicarboxylic acid, diphenyl ether-4,4'-dicarboxylic acid, adipic acid, sebacic acid and the like. Examples of the glycol components include propylene glycol, butylene glycol, diethylene glycol, dipropylene glycol, neopentyl glycol, cyclohexane dimethanol, 2,2-bis(4-hydroxyphenyl)propane, 2,2-bis(4-hydroxy-2,3,5,6-tetrabromophenyl)propane and the like. Further, there can be used a hydroxy acid such as p-hydroxybenzoic acid, p-hydroxyethoxybenzoic acid and the like as the copolymerizable component. Furthermore, a small amount of a trifunctional component can be copolymerized in an extent such that molding characteristics are not adversely affected. Preferably, the polyester has an intrinsic viscosity measured in a mixed solvent of phenol/tetrachloroethane (6/4, w/w) at 30° C. of not less than 0.5, more preferably, not less than 0.55.

The carboxylic acid ester of a polyalkylene glycol or its derivative (b) used in the present invention is, for example, a compound of the following formula:

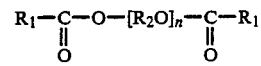

or

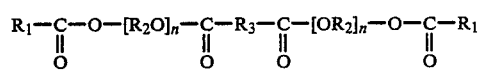

wherein n is an integer from 2 to 30; $R_1$ is an aliphatic or aromatic hydrocarbon group having 1 to 18 carbon atoms, preferably, 1 to 10 carbon atoms: $R_2$ is an aliphatic hydrocarbon group having 2 to 6 carbon atoms: and $R_3$ is an aliphatic or aromatic hydrocarbon group having 1 to 10 carbon atoms.

Preferably, there can be used the compound obtained by reacting the terminal groups of the polyalkylene glycol or its derivative such as polyethylene glycol, polypropylene glycol, polytetramethylene glycol, polyneopentyl glycol, polyethylene glycol-polypropylene glycol copolymer, polyethylene glycol-polytetramethylene glycol copolymer and the like, with a monocarboxylic acid such as acetic acid, propionic acid, butyric acid, valeric acid, caproic acid, caprylic acid, capric acid, lauric acid, palmitic acid, stearic acid, benzoic acid and the like, or partly with a dicarboxylic acid such as adipic acid, sebacic acid, terephthalic acid, isophthalic acid and the like. Preferably, the compound has an average molecular weight of not more than 5,000, more preferably, 200 to 3,000, particularly, 300 to 1,500. When the average molecular weight is too high, miscibility is lowered and effect on acceleration of crystallization is lost. On the other hand, when the average molecular weight is too low, gas is produced during molding and, sometimes bleed results after molding. Further, in view of properties of the polyester composition and a molded product obtained therefrom, preferably, the compound has an acid value of not more than 20 mg KOH/g, particularly, not more than 5 mg KOH/g.

In the polyester composition of the present invention, the carboxylic acid ester of the polyalkylene glycol or its derivative (b) is formulated in an amount of 1 to 15 parts by weight, preferably, 5 to 15 parts by weight per 100 parts by weight of the polyester (a). When the amount is less than 1 part by weight, improvement of molding characteristics at a low temperature is hardly noted. On the other hand, when the amount is more than 15 parts by weight, properties of the composition become inferior.

The epoxy compound having a polyoxyalkylene chain (c) used in the present invention is, for example, a polyalkylene glycol glycidyl ether of the formula:

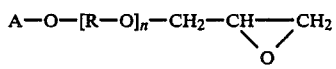

wherein A is a hydrocarbon group, particularly, an aliphatic or aromatic hydrocarbon group having 1 to 20 carbon atoms, hydrogen or glycidyl group: R is an aliphatic hydrocarbon group having 1 to 5 carbon atoms: and n is an integer of not less than 2. Examples of the compound (c) include mono or diglycidyl ether of polyethylene glycol, mono or diglycidyl ether of polypropylene glycol, mono or diglycidyl ether of polytetra-methylene glycol, mono or diglycidyl ether of polyneopentyl-glycol, mono or diglycidyl ether of polyethylene glycol-polypropylene glycol copolymer, mono or diglycidyl ether of polyethylene glycol-polytetramethylene glycol copolymer, monoglycidyl ether of phenoxypolyethylene glycol, mono-glycidyl ether of ethoxypolypropylene glycol and the like. Other than those represented by the above formula, mono or polyglycidyl ethers of a polyhydric alcohol-alkylene oxide adduct such as glycerin-alkylene oxide adduct, neopentyl glycol-alkylene oxide adduct, and pentaerythritol-alkylene oxide adduct are also preferred. However, the epoxy compound used in the present invention is not limited to these compounds. The average molecular weight of the epoxy compound is preferably not more than 5,000, more preferably, 200 to 3,000, particularly, 300 to 1,500. When the molecular weight is too high, miscibility for the polyester is lowered and effect on acceleration of crystallization is lost. Further, in order to improve dispersibility of the compound and mechanical properties of the composition, it is preferable that the epoxy compound has not less than 1.2 epoxy groups on average in the molecule thereof. Preferably, the epoxy compound originally contains both polyoxyalkylene chain and epoxy group in the molecule thereof. However, a mixture which can produce the desired epoxy compound having the polyoxyalkylene chain by a reaction during mixing with the resin can be also used as the epoxy compound.

In the polyester composition of the present invention, the epoxy compound having the polyoxyalkylene chain (c) is formulated in an amount of 0.01 to 10 parts by weight, preferably, 0.5 to 5 parts by weight per 100 parts by weight of the polyester (a) depending upon the molar fraction of the polyoxyalkylene chain and the epoxy equivalent. When the amount is smaller than this, improvement of dispersibility of the polyalkylene glycol or its derivative is insufficient. On the other hand, when the amount is too large, the viscosity of the resin increases, which adversely affects molding of a thin-walled molded product.

The inorganic filler (d) of the present invention is used as a nucleating agent as well as to elevate heat distortion temperature, and plate materials such as talc and mica are preferred. Particularly, plate materials having average particle size of 0.2 to 15μ are preferred.

In the polyester composition of the present invention, the inorganic filler (d) is formulated in an amount of 0.1 to 50 parts by weight, preferably, 5 to 30 parts by weight per 100 parts by weight of the polyester (a). When the amount is less than 0.1 part by weight, heat distortion temperature is low. On the other hand, when the amount is more than 50 parts by weight, fluidity in molding becomes inferior.

According to a particular purpose and use, the composition of the present invention can contain various additives such as fibrous reinforcing materials, stabilizers (e.g., antioxidants, UV absorbing agents etc.), plasticizer, lubricants, flame-retardants, antistatic agents, colorants, mold release agents, metallic powders and the like. From the viewpoint of the objects of the present invention, it is preferable to formulate, particularly, fibrous reinforcing materials and antioxidants.

A method for producing the polyester composition of the present invention is not limited to a specific one and it can be produced according to a known method. For example, the polyester composition of the present invention is produced by premixing all the ingredients and then melt-kneading the mixture in an extruder or a kneader, or by previously kneading several ingredients in an extruder or a kneader to obtain pellets and then melt-kneading the remaining ingredients with the pellets.

The polyester composition of the present invention does not require a special molding method and special molding conditions and it can be subjected to molding under known molding conditions for conventional crystalline thermoplastic resins to give a molded product having high heat-resisting dimensional accuracy and excellent mechanical properties. Accordingly, the polyester composition of the present invention can be used in molding of various molded members, sheet materials such as films or plates, fibrous materials, tubular materials, containers and the like. Further, the polyester composition of the present invention can be used as covering materials, coating materials adhesives and improvers of other resins.

According to the present invention, it is possible to formulate both the epoxy compound having the polyoxyalkylene chain (c) which is a terminal reactive type crystallization accelerating agent, and the carboxylic acid ester of polyalkylene glycol or its derivative (b) which is a crystallization accelerating agent having affinity for the epoxy compound (c) but having no reactivity with the polyester (a) in a much larger amount than that expected in formulating each crystallization accelerating agent alone. Further, the inorganic filler (d) shows reinforcing effect. It is considered that both lowering of crystallization temperature and increase in crystallization rate can be realized by the combination of these ingredients according to the present invention.

The following Examples and Comparative Examples further illustrate the present invention in detail but are not to be construed to limit the scope thereof. In the Examples and Comparative Examples, all "parts" are by weight unless otherwise stated.

Evaluation of properties of test pieces in the Examples and Comparative Examples were carried out by the following test methods.

(1) Heat distortion temperature

According to ASTM D-648, heat distortion temperature of a test piece having 1/16 inch in thickness molded at the mold temperature of 70° C. was measured under the loading of 18.5 kg/cm².

(2) Crystallization temperature

By using a differential scanning calorimeter, crystallization temperature with a rise in temperature ($TC_1$) was measured at a rate of temperature rise of 20° C./min. under nitrogen atmosphere. Likewise, crystallization temperature with a drop in temperature from a molten state ($TC_2$) was measured at at a rate of temperature drop of 20° C./min.

(3) Tensile strength

Tensile strength was measured according to ASTM D-638.

EXAMPLES 1-11 AND COMPARATIVE EXAMPLES 1-10

Polyethylene terephthalate (100 parts) was premixed with the carboxylic acid ester of polyethylene glycol (average molecular weight of about 400), the glycidyl ether of polyethylene glycol (average molecular weight of about 400), and talc having average particle size of 4μ (manufactured and sold by Hayashi Kasei K.K., in Japan under the trade name of "MICRONWHITE #5000") in the amounts shown in the following Table 1A, respectively, as well as glass fiber (manufactured and sold by Asahi Fiberglass K.K. in Japan under the trade name of "GLASSLON") (51.6 parts), partial calcium salt of montanic acid ester (0.86 part) and Irganox 1010 (the trade name of an antioxidant manufactured and sold by Ciba-Geigy) (0.7 part). The mixture was fed to a hopper of a twin-screw extruder PCM 30 and melt-kneaded at the cylinder temperature of 270° to 280° C. to obtain compound chips. The compound chips were dried at 130° C. for 4 hours and was molded into test pieces by using an injection machine (manufactured and sold by Nissei Jushi Kogyo K.K. in Japan under the trade name of "FS 75") at the cylinder temperature of 260°-265°-275° C. and the mold temperature of 70° C. Properties of the test pieces obtained were evaluated. The results are shown in Table 1B.

TABLE 1A

| No. | PEG* carbonate Carboxylic | parts | PEG diglycidyl ether parts | Nucleating agent material | parts |
|---|---|---|---|---|---|
| Comp. Ex. 1 | — | — | — | talc | 5.2 |
| Comp. Ex. 2 | — | — | 1.7 | talc | 5.2 |
| Ex. 1 | dibenzoate | 1.7 | 1.7 | talc | 5.2 |
| Ex. 2 | dibenzoate | 3.4 | 1.7 | talc | 5.2 |
| Ex. 3 | dibenzoate | 5.2 | 1.7 | talc | 5.2 |
| Ex. 4 | dibenzoate | 6.9 | 1.7 | talc | 5.2 |
| Ex. 5 | dibenzoate | 8.6 | 1.7 | talc | 5.2 |
| Comp. Ex. 3 | dibenzoate | 1.7 | — | talc | 5.2 |
| Comp. Ex. 4 | dibenzoate | 3.4 | — | talc | 5.2 |
| Comp. Ex. 5 | — | — | 3.4 | talc | 5.2 |
| Comp. Ex. 6 | dibenzoate | 5.2 | — | talc | 5.2 |
| Comp. Ex. 7 | dibenzoate | 8.6 | — | talc | 5.2 |
| Ex. 6 | dibenzoate | 3.4 | 3.4 | talc | 5.2 |
| Ex. 7 | diacetate | 3.4 | 3.4 | talc | 5.2 |
| Ex. 8 | diacetate | 5.2 | 1.7 | talc | 5.2 |
| Comp. Ex. 8 | diacetate | 6.9 | — | talc | 5.2 |
| Comp. Ex. 9 | dibenzoate | 5.2 | 1.7 | — | — |
| Ex. 9 | dibenzoate | 5.2 | 1.7 | talc | 17.2 |
| Comp. Ex. 10 | — | — | 6.9 | talc | 5.2 |
| Ex. 10 | dibenzoate | 5.2 | 1.7 | mica | 8.6 |
| Ex. 11 | dibenzoate | 1.7 | 5.2 | mica | 8.6 |

*PEG: polyethylene glycol (M.W. about 400)

TABLE 1B

| No. | Heat distortion temperature °C. | $TC_1$ °C. | $TC_2$ °C. | Tensile strength kg/mm² |
|---|---|---|---|---|
| Comp. Ex. 1 | Δ77 | 113 | 208 | 13.3 |
| Comp. Ex. 2 | Δ77 | 110 | 206 | 13.8 |
| Ex. 1 | 110 | 105 | 205 | 14.4 |
| Ex. 2 | 128 | 100 | 205 | 13.9 |
| Ex. 3 | 210 | 93 | 206 | 13.6 |
| Ex. 4 | 211 | 89 | 207 | 12.9 |
| Ex. 5 | 212 | ≦85 | 207 | 12.7 |
| Comp. Ex. 3 | Δ88 | 113 | 207 | 12.8 |
| Comp. Ex. 4 | 179 | 112 | 207 | Δ11.6 |
| Comp. Ex. 5 | Δ89 | 115 | 202 | 14.5 |
| Comp. Ex. 6 | 211 | 105 | 208 | Δ11.0 |
| Comp. Ex. 7 | 214 | 101 | 209 | Δ10.4 |
| Ex. 6 | 204 | 98 | 208 | 12.3 |
| Ex. 7 | 170 | 99 | 207 | 13.1 |
| Ex. 8 | 198 | 97 | 209 | 12.5 |
| Comp. Ex. 8 | 212 | 93 | 209 | Δ10.7 |
| Comp. Ex. 9 | Δ85 | 93 | 203 | 13.7 |
| Ex. 9 | 220 | 100 | 212 | 13.1 |
| Comp. Ex. 10 | Δ impossible to mold | | | |
| Ex. 10 | 198 | 95 | 207 | 13.5 |
| Ex. 11 | 190 | 99 | 207 | 13.9 |

*Δ: insufficient properties

As seen from Table 1, the composition of the present invention meets all the requirements of a heat distortion of not less than 110° C., crystallization temperature ($TC_1$) of not less than 105° C. and tensile strength of not less than 12.3 kg/mm².

Thus, the polyester composition of the present invention can provide a molded product in which crystallization progresses to the surface layer thereof even when molding is carried out at a low mold temperature such as 70° C. Further, phase separation and gas production during molding are fully prevented and it is possible to obtain a thin-walled molded product having good dimensional stability.

What is claimed is:

1. A polyester composition which comprises
   (a) 100 parts by weight of a polyester containing at least 80 mol % of ethylene terephthalate repeating unit;
   (b) 1 to 15 parts by weight of a carboxylic acid ester of a polyalkylene glycol or its derivative having the formula:

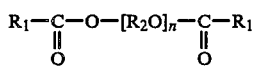

or

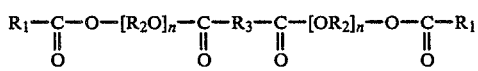

wherein n is an integer from 2 to 30; $R_1$ is aliphatic or aromatic hydrocarbon group having 1 to 18 carbon atoms; $R_2$ is an aliphatic hydrocarbon group having 2 to 6 carbon atoms; and $R_3$ is an aliphatic or aromatic hydrocarbon group having 1 to 10 carbon atoms;
   (c) 0.01 to 10 parts by weight of a diepoxy or polyepoxy compound having a polyoxyalkylene chain which is

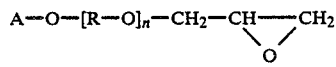

wherein A is a glycidyl group, R is an aliphatic hydrocarbon group having 1 to 5 carbon atoms, and n is an integer of not less than 2, or polyglycidyl ether of glycerin-alkylene oxide adduct, neopentyl glycol-alkylene oxide adduct, or pentaerythritol-alkylene oxide adduct;
   (d) 0.1 to 50 parts by weight of an inorganic filler selected from the group consisting of talc and mica; and
   (e) a reinforcing amount of glass fiber.

2. A polyester composition according to claim 1, wherein $R_1$ has 1 to 10 carbon atoms.

3. A polyester composition as recited in claim 1 wherein the diepoxy or polyepoxy compound is diglycidyl ether of polyethylene glycol.

4. A ployester composition as recited in claim 3, wherein the carboxylic acid ester of a polyalkylene glycol or its derivative is a carboxylic acid ester of polyethylene glycol.

5. A polyester composition as recited in claim 4, wherein the carboxylic acid ester of polyethylene glycol is dibenzoate or diacetate of polyethylene glycol.

6. A polyester composition as recited in claim 5, wherein the carboxylic acid ester of polyethylene glycol is dibenzoate of polyethylene glycol.

* * * * *